United States Patent Office 3,657,170
Patented Apr. 18, 1972

3,657,170
STABILIZATION OF UNVULCANIZED OIL-EXTENDED INTERCONNECTED LINEAR-RUBBERY-POLYMERS
Arthur E. Oberster, North Canton, Ohio, and Ervin E. Schroeder, Lake Charles, La., assignors to The Firestone Tire & Rubber Company, Akron, Ohio
No Drawing. Continuation-in-part of application Ser. No. 663,219, Aug. 25, 1967, which is a continuation-in-part of application Ser. No. 611,831, Jan. 26, 1967. This application Mar. 13, 1970, Ser. No. 19,493
Int. Cl. C08d 11/04
U.S. Cl. 260—23.7 M
4 Claims

ABSTRACT OF THE DISCLOSURE

An unvulcanized oil-extended interconnected linear-rubbery-polymer is stabilized by means of a synergistic mixture of (a) a substantial amount of a fatty acid having 12 to 22 carbon atoms per molecule and (b) a substantial amount of a compound having the formula

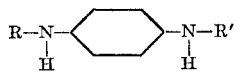

in which R is a phenyl, tolyl, straight-chain-alkyl, branched-chain-alkyl, cycloalkyl or hydroxy-alkyl group containing 3 to 8 carbon atoms, and R' is a straight-chain-alkyl, branched-chain-alkyl, cycloalkyl or hydroxy-alkyl group containing 3 to 8 carbon atoms.

---

This application is a continuation-in-part of our abandoned application Ser. No. 663,219, filed Aug. 25, 1967 which is a continuation-in-part of our abandoned application Ser. No. 611,831, filed Jan. 26, 1967.

This invention relates to the use of synergistic mixtures of stabilizer components in oil-extended stereo-regular homopolymers of conjugated diolefins of 4 and 5 carbon atoms and copolymers thereof with olefins, and more particularly the copolymer of butadiene and styrene, and especially interconnected polymers.

Unvulcanized interconnected rubbery polymers are those in which the viscosity and molecular weight have been jumped or otherwise substantially increased by reaction of the initially produced linear polymer with a suitable reagent to increase the molecular weight and at the same time the branching of the polymer. One type of such reaction is exemplified by the reaction of silicon tetrachloride with a live polybutadiene produced by polymerization of butadiene in a non-aqueous system by means of a lithium-based catalyst (e.g., butyllithium or tetramethylene dilithium), the interconnected polymer containing a silicon atom in the center with four hydrocarbon polymer fragments extending therefrom to form a star." Another type of such interconnecting reaction, termed "jumping," is exemplified by the procedure described by E. F. Engel et al., Rubber Age, December 1964, pages 410–415; any unsaturated rubbery polymer can be jumped by treatment with a two-part catalyst consisting of a Friedel-Crafts catalyst plus a cocatalyst, such as titanium tetrachloride and thionylchloride or ethyl-aluminum sesquichloride and water. Another type of molecular-weight-increasing-reaction, or interconnecting reaction, is exemplified by the reaction of an olefinically unsaturated rubbery polymer with a halogenated organic compound (e.g. ethylene dichloride) in the presence of a strong base (e.g. butyllithium) to produce a mixture of higher molecular weight rubbery polymers of branched construction, and, typically, exemplified by a mixture of polymers having a molecular weight distribution including the original molecular weight of the unreacted rubbery polymer to molecular weights of dimers, trimers, tetramers and higher polymers of the original rubbery polymer. All of these polymers of enhanced molecular weight contemplated by the invention have improved ability to accept extending oil and also possess improved milling and extruding properties ("processing" properties) as compared with the original linear rubbery polymer.

Difficulty has been experienced in stabilizing many oil-extended rubbery polymers. The synergistic stabilizer combinations of this invention provide excellent stabilization of unvulcanized oil-extended interconnected linear rubbery polymers, i.e. an unvulcanized linear rubbery polymer which has been interconnected and oil extended. The invention finds widest use in the stabilization of such copolymers of butadiene and styrene but is useful with other interconnected rubbery polymers, and particularly the polybutadienes, polyisoprenes and butadiene-isoprene copolymers. Polymers suitable for use in the interconnecting reaction can be conveniently made by the methods of British Pats. 817,693, 817,695 and 813,198, for example.

Any of the oils commonly used in the extension of rubbers can be employed, including particularly higher boiling petroleum fractions such as the commercially known naphthenic and aromatic mineral oils. In the extension of rubbers with oils, about 37.5 parts of oil are customarily used with 100 parts of polymer, although the amount of oil can vary from 15 to 75 parts, more or less. The oil preferably is added to the polymer after the polymerization and interconnecting reactions are completed, but can be added before either reaction, if desired. The synergistic stabilizer combination can be added prior to the addition of the oil, it can be added with the oil, or it can be added soon thereafter.

The stabilizer is a synergistic mixture of one or more fatty acids having 12 to 22 carbon atoms per molecule and a disubstituted para-phenylene diamine and may include a phenolic stabilizer such as dibutyl p-cresol. (Para-phenylene diamine is herein termed PPD.) Usually 18-carbon acids will be used such as oleic acid, stearic acid, linoleic acid, and linolenic acid, although the other fatty acids of 12 to 22 carbon atoms can be employed, including palmitic acid, myristic acid, ricinoleic acid, erucic acid, eleostearic acid, arachidonic acid, culpanodonic acid and licanic acid.

The PPD derivatives include N,N'-dialkyl and N-alkyl-N'-aryl PPD's. The PPD derivatives used in the synergistic mixture are compounds having the following formmula:

in which R represents a substituent of the class consisting of phenyl, tolyl and straight-chain-alkyl, branched-chain-alkyl, cycloalkyl and hydroxyl-alkyl groups of 3 to 8 carbon atoms, and R' represents a substituent of the class consisting of straight-chain-alkyl, branched-chain-alkyl, cycloalkyl and hydroxy-alkyl groups of 3 to 8 carbon atoms. Preferred compounds are N,N'-di (sec.hexyl, heptyl and octyl) PPD's and N-(sec.hexyl, heptyl and octyl), N'-phenyl PPD's. Representative compounds follow.

N,N'-di(sec.-butyl-p-phenylenediamine
N,N'-di-3-(5-methylheptyl)-p-phenylenediamine
N,N'-di-sec.hexyl-p-phenylenediamine
N,N'-di-2-octyl-p-phenylenediamine
N,N'-di-2-(5-methylhexyl)-p-phenylenediamine
N,N'-dicyclohexyl-p-phenylenediamine
N-phenyl-N'-2-(4-methyl-4-hydroxypentyl)-p-phenylenediamine
N-phenyl-N'-2-(4-methylpentyl)-p-phenylenediamine
N-phenyl-N'-2-(5-methylhexyl)-p-phenylenediamine
N-phenyl-N'-isopropyl-p-phenylenediamine
N-phenyl-N'-2-octyl-p-phenylenediamine
N-phenyl-N'-sec.-butyl-p-phenylenediamine
N-phenyl-N'-sec.-amyl-p-phenylenediamine
N-phenyl-N'-(1-ethyl-3-methylpentyl)-p-phenylenediamine
N-phenyl-N'-cyclohexyl-p-phenylenediamine The phenyl substituent of the foregoing may be replaced by tolyl.

The synergistic mixture is incorporated into the polymer in any usual manner, ordinarily before the polymer is separated from the medium in which it is produced; and the components can be added separately or they can be mixed and then added to the polymer. The acid improves the solubility of the PPD derivative in the organic solvent in which the polymer is dissolved when produced. Any substantial amount of acid used with any substantial amount of PPD derivative provdes the desired synergistic polymer stabilization effect. The amount of acid will be at least 0.1 part per 100 parts of polymer (referred to herein as "phr."), and preferably will be between 0.3 and 0.7 phr.; ordinarily, not more than one part of acid will be used per 100 parts of polymer, because this would involve unnecessary expense. The amount of PPD derivative will vary from 0.005 to 5 phr., usually from 0.3 to 0.7 phr. Preferably, the total amount of the synergistic combination will be at least 0.3 phr., and not more than about 2 phr.

The synergistic effect is recognized by the lessening of the decrease in the viscosity of the polymer on heat aging. A phenolic stabilizer such as 2,6-dibutyl-p-cresol (DBPC) also can be used in amounts from 0.1 to 1.0 phr. and preferably 0.3 to 0.7 phr., but apparently it does not act synergistically with either of the other two types of stabilizer components, alone. Synergism is established with the use of the fatty acid together with both the PPD derivative and the phenolic stabilizer.

The effectiveness of various mixtures is illustrated in the following tables. The tables refer to the stabilization of the polymer. The synergistic combinations are added to protect the polymer during storage and processing. The vulcanizates are useful wherever rubber vulcanizates have been employed, as in the manufacture of tires, hose, and a wide variety of products.

The polymer used in the tests recorded in the following table was prepared by reaction of $SiCl_4$ with live butadienestyrene copolymer obtained through polymerization in a hydrocarbon aliphatic solvent utilizing butyllithium as a catalyst. It was extended with 37.5 phr. of extending oil. The solvent was then removed from the unvulcanized, oil-extended, interconnected polymer by evaporation.

The viscosities in Table I are Mooney viscosities (ML/4/100° C.). The heading R.T. in the last column, refers to Retained Viscosity; the figures given are the percents of the original viscosities retained after aging for any particular period. In the first line the R.T. is for the product after aging three days, and in each subsequent line it is the viscosity retained after aging for four days.

TABLE I

| Phr. | | | | Daily change in viscosity on aging— | | | | | |
|---|---|---|---|---|---|---|---|---|---|
| Stabilizer | | | | | | | | | |
| A | B | DBPC | Oleic acid | 0 day | 1 day | 2 days | 3 days | 4 days | R.T. |
| 0.007 | | 0.3 | | 36.0 | 30.0 | 22.0 | 17.0 | [1] NT | 47 |
| 0.007 | | 0.3 | 0.1 | 37.5 | 29.0 | 23.5 | 21.5 | 17.5 | 46.5 |
| 0.007 | | 0.3 | 0.5 | 37.0 | 33.5 | 28.0 | 25.5 | 23.0 | 62 |
| 0.007 | | 0.3 | 1.0 | 36.0 | 32.0 | 28.0 | 26.0 | 20.5 | 57 |
| | 0.3 | | 0.3 | 27.0 | 24.5 | 25.5 | 25.0 | 28.5 | 100 |
| | 0.2 | | 0.5 | 28.0 | 26.0 | 28.0 | 28.0 | 28.5 | 100 |
| | 0.3 | | 0.5 | 25.5 | 23.5 | 25.0 | 26.5 | 27.5 | 100 |
| | 0.5 | | 0.5 | 25.0 | 25.0 | 27.0 | 26.5 | 26.5 | 100 |

[1] NT indicates that on aging the polymer became too soft to test.

In the foregoing table and also in the following tables, Stabilizer A is N,N'-di(1-ethyl-3-methylpentyl) PPD known commercially as Eastozone 31 and U.O.P. 88 and Stabilizer B is N-phenyl-N'-2(4-methylpentyl) PPD, otherwise known as Santoflex 13. The amounts of the different stabilizing ingredients are given in parts per 100 parts of rubber. The stabilized polymers were aged in an air-circulating oven at 75° C. and their viscosities were determined daily. The viscosities are recorded as Mooney viscosity (ML/4/100° C.) and are given for the original polymer before aging and during for four days. It will be noted that the stabilizing effect is synergistic. As little as 0.1 part of acid had little effect, and 0.3 part or more to 100 parts of the polymer will normally be used. The table shows the excellent stabilizing effect of using as little as 0.3 phr. of fatty acid along with the PPD derivative. The retained viscosities are percents of the original viscosities retained after four days aging, or for a shorter period of one, two or three days if the product became too soft to test before aging four days. The last four samples in Table I were very well stabilized and show no deterioration over the four-day aging period.

Tables II, III and IV show the results obtained on testing the synergistic effect of acids and PPD derivatives in an oil-extended unvulcanized interconnected linear copolymer of butadiene and styrene prepared by a different interconnecting reaction. Comparing the results with those in Table I, it will be seen that the data are additive.

TABLE II

| Phr: | | | | | Daily change in viscosity on aging— | | | | | |
|---|---|---|---|---|---|---|---|---|---|---|
| Stabilizer | | | Acid | | | | | | | |
| A | B | DBPC | Oleic | Linoleic | 0 day | 1 day | 2 days | 3 days | 4 days | R.T. |
| 0.007 | | 0.3 | | | 41.5 | 31.0 | 22.5 | 16.5 | [1] NT | 40 |
| 0.007 | | 0.3 | | 0.4 | 43.0 | | 30.0 | 24.5 | 22.0 | 51 |
| 0.007 | | 0.3 | | 0.9 | 43.0 | | 33.0 | 26.5 | 24.5 | 57 |
| 0.007 | | 0.3 | 0.5 | | 40.5 | | 30.5 | 25.0 | 20.5 | 51 |
| 0.5 | | | 0.5 | | 35.0 | 32.0 | 31.0 | 32.5 | 32.0 | 91.5 |
| | | | 0.5 | | 41.0 | 38.5 | 37.0 | 34.5 | 32.5 | 79 |
| | 0.5 | | 0.5 | | 41.5 | 35.5 | 32.0 | 27.5 | 25.5 | 61.5 |
| | 0.5 | | | | 38.5 | 34.0 | 30.0 | 26.5 | 25.0 | 65 |
| | 1.0 | | | | 44.0 | 42.5 | 41.0 | 38.5 | 38.0 | 86 |
| | 0.3 | | 0.3 | | 42.0 | 44.0 | 41.5 | 38.5 | 37.5 | 89.3 |
| | 0.2 | | 0.5 | | 24.5 | 15.0 | NT | NT | NT | |
| | | | 0.5 | | 26.5 | 22.0 | 15.0 | NT | NT | 56 |
| | | 0.3 | | | 25.0 | 18.5 | 14.0 | NT | NT | 56 |
| | | 0.3 | 0.5 | | 28.5 | 17.0 | NT | NT | NT | |
| Blank | | | | | | | | | | |

[1] NT indicates that on aging the polymer became too soft to test.

The synergistic effect is evident when it is seen that the results in the last two lines before the Blank became too soft for testing after two days, whereas with the combination recited in the fourth line the viscosity was measurable after four days of aging.

TABLE III

| Stabilizer | Phr. | Daily change in viscosity on aging— | | | | | R.T. |
| --- | --- | --- | --- | --- | --- | --- | --- |
| | | 0 day | 1 day | 2 days | 3 days | 4 days | |
| Stabilizer B | 0.5 } | 32.0 | 29.5 | 27.5 | 27.5 | 27.0 | 84 |
| Oleic acid | 0.5 | | | | | | |
| Stabilizer B | 0.5 } | 32.0 | 30.5 | 29.5 | 29.0 | 28.5 | 89 |
| Stearic acid | 0.5 | | | | | | |
| Stabilizer B | 0.5 } | 31.5 | 30.0 | 28.5 | 29.0 | 27.5 | 87 |
| Emery 3325 | 0.5 | | | | | | |
| Stabilizer B | 0.5 | 34.0 | 31.0 | 26.5 | 22.0 | 20.0 | 60 |
| Stabilizer B | 0.5 } | 31.0 | 28.5 | 28.0 | 28.0 | 27.5 | 90 |
| Emery 3325 | 1.0 | | | | | | |
| Stabilizer B | 0.5 } | 30.5 | 28.5 | 27.0 | 26.5 | 26.0 | 85 |
| Acintol EPG | 0.5 | | | | | | |

TABLE IV

| Stabilizer | Phr. | Daily change in viscosity on aging— | | | | R.T. |
| --- | --- | --- | --- | --- | --- | --- |
| | | 0 day | 2 days | 3 days | 4 days | |
| Stabilizer B | 0.5 } | 32.5 | 28.0 | 24.5 | 23.0 | 71 |
| Oleic acid | 0.5 | | | | | |
| Stabilizer B | 0.5 } | 34.0 | 30.5 | 28.0 | 26.5 | 78.5 |
| Stearic acid | 0.5 | | | | | |
| Stabilizer B | 0.5 } | 33.5 | 30.5 | 27.0 | 25.0 | 74 |
| Emery 3325 | 0.5 | | | | | |
| Stabilizer B | 0.5 | 36.0 | 25.0 | 19.5 | 17.5 | 48 |
| Stabilizer B | 0.5 } | 34.5 | 29.0 | 26.0 | 25.5 | 74 |
| Acintol EPG | 0.5 | | | | | |
| Stabilizer B | 0.5 } | 33.5 | 27.0 | 25.0 | 24.0 | 72 |
| Acintol FA-1 | 0.5 | | | | | |
| Stabilizer B | 0.5 } | 34.5 | 27.5 | 25.5 | 23.5 | 68 |
| Acofor | 0.5 | | | | | |
| Stabilizer B | 0.5 } | 34.5 | 31.5 | 29.5 | 28.0 | 81 |
| F-60 fatty acid | 0.5 | | | | | |
| Stabilizer B | 0.5 } | 33.5 | 35.5 | 29.5 | 29.0 | 87 |
| Emery 3325 | 1.0 | | | | | |
| Stearic acid | 1.0 | 33.0 | 25.5 | 16.5 | 15.5 | 50 |
| Emery 3325 | 1.0 | 34.5 | 18.0 | 12.0 | 12.0 | 34 |

Tables I and II show that oil-extended interconnected polymers become too soft for Mooney determinations upon aging unless they are stabilized in accordance with the invention. Such unstabilized or inadequately stabilized polymers, in effect, lose their rubbery properties upon aging and become of little or no commercial value. Liquid rubbery polymers are simply unsaleable to rubber fabricators interested in purchasing rubbery polymers for conventional working on a rubber mill or in a Banbury mixer for mixing with compounding ingredients in order to produce vulcanizable rubber compositions useful in the manufacture of pneumatic tires and other rubber articles.

In Table IV certain of the stabilizer compositions set forth in Table III are repeated. This is because the polymers of Table III, as well as Tables I and II, were recovered by merely flashing-off the organic solvent in which the polymer was produced. The results of Table IV refer to the stabilization of polymers recovered by steam vola- tilization of the organic solvent. In both cases the recovered polymers were interconnected linear rubbery polymers and they were aged at 75° C. in an air-circulating oven. The viscosities are recorded as Mooney viscosities (ML/4/100° C.) and are given for the original polymer before aging and during aging, for the indicated times, and the percentages of the original viscosity retained after aging four days is given in the last column (R.T.). In each formulation the PPD derivative was Stabilizer B (designated Stabilizer B in the tables). In various of the formulations a mixed acid of about 44 percent oleic acid, 23 percent stearic acid, 30 percent palmitic acid, and 3 percent myristic acid was used, and is identified as Emery 3325. The F-60 fatty acid refers to a similar mixture of fatty acids produced by Procter & Gamble. A mixture of fatty acids containing substantially 43.5 percent linoleic acid and 51.2 percent oleic acid is identified as Acintol EPG. Acintol FA-1 is essentially 41.6 percent linoleic acid, 49.6 percent oleic acid, and 3.8 percent saturated fatty acid. Acofor is essentially 48.5 percent oleic acid, 46 percent linoleic acid, and 3 percent saturated fatty acid. The foregoing refer to commercial acid preparations which contain some unsaponifiable ingredients.

The stabilized oil-extended polymers of the invention are useful in practically every instance in which conventional oil-extended SBR, oil-extended natural rubber and oil-extended linear rubbery polymers have been useful, including, without limitation, use in pneumatic tire treads, sidewalls and carcass stocks. Also the stabilized polymers of the invention can be blended with other known polymers to provide useful commercial compositions for fabrication into useful shapes and articles. The stabilized polymers of the invention are advantageously blended with known rubbers (e.g., natural rubber, SBR, BR, IR, IIR, CR ISR), with or without additional extending oils, for forming vulcanizates of great technical importance. The novel stabilized polymers are advantageously mixed with the known reinforcing carbon blacks to produce ueseful commercial stocks, which also can contain one or more additional rubbery polymers, and also can contain 5 to 100 phr. of additional extending oil or plasticizer. Sulfur and other known vulcanizing agents for natural rubber and the commercial synthetic rubbers are useful for forming vulcanizable stocks containing the novel stabilized polymer. Known antioxidants and antiozonants for vulcanized natural and synthetic rubbers of commerce find similar utility in vulcanized compositions containing the novel stabilized polymer; however, in many applications the PPD stabilizer component of the invention becomes an effective antioxidant and antiozonant in vulcanizates made from such novel polymer. Known methods of mixing, forming, fabricating and curing or vulcanizing compositions of natural and commercial synthetic rubbers are applicable to and useful with compositions containing the novel stabilized polymesr of the invention. The novel polymers are especially useful in pneumatic tire tread, sidewall and carcass compositions, and the considerations of this paragraph are especially relevant to the use of the novel polymers in tires.

We claim:
1. Unvulcanized, oil-extended, linear rubbery polymer of increased molecular weight derived from homopolymers of conjugated diolegns of 4 and 5 carbon atoms and copolymers thereof with olefins and obtained by interconnecting polymer molecules of lower molecular weight, stabilized by (a) 0.1 to 1 part of one or more fatty acids containing 12 to 22 carbon atoms per molecule and (b) .005 to 5 parts of a compound having the formula

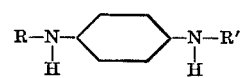

in which R is a phenyl, tolyl, straight - chain - alkyl, branched-chain-alkyl, cycloalkyl or hydroxy-alkyl group containing 3 to 8 carbon atoms, and R' is a straight-chain-alkyl, branched-chain-alkyl, cycloalkyl or hydroxyalkyl group containing 3 to 8 carbon atoms, said parts being parts per 100 parts of the polymer.

2. The unvulcanized polymer of claim 1 in which the polymer is butadiene-styrene copolymer.

3. The unvulcanized polymer of claim 1 in which (b) component is from the group consisting of N,N'-di-sec-hexyl, N,N'-di-sec-heptyl, N,N'-di-sec-octyl, N-phenyl-N'-isopropyl, N-phenyl-N'-sec-hexyl, N-phenyl-N'-hydroxyhexyl and N-phenyl-N'-butyl paraphenylenediamines.

4. The unvulcanized polymer of claim 3 which contains 0.3 to 0.7 part of (a) component and 0.3 to 0.7 part of (b) component together with 0.3 to 0.7 part of di-butyl-para-cresol.

References Cited
UNITED STATES PATENTS

| | | | |
|---|---|---|---|
| 3,426,006 | 2/1969 | Nutzel et al. | 260—83.5 |
| 3,449,306 | 6/1969 | Zelinski | 260—83.7 |
| 3,496,154 | 2/1970 | Wolford | 260—84.7 |
| 3,163,616 | 12/1964 | Stahly | 260—28.5 |
| 3,281,383 | 10/1966 | Zelinski et al. | 260—23.7 |
| 3,337,494 | 8/1967 | Reid et al. | 260—45.9 |
| 3,400,099 | 9/1968 | Cook | 260—45.85 |
| 3,424,713 | 1/1969 | Oberster et al. | 260—45.9 |

MAURICE J. WELSH, Primary Examiner

D. J. BARRACK, Assistant Examiner

U.S. Cl. X.R.

260—23.7 R, 33.6 A Q, 45.9 R, 45.95

UNITED STATES PATENT OFFICE
CERTIFICATE OF CORRECTION

Patent No. 3,657,170      Dated April 18, 1972

Inventor(s) Arthur E. Oberster and Ervin E. Schroeder

It is certified that error appears in the above-identified patent and that said Letters Patent are hereby corrected as shown below:

Col. 2, line 51, "culpanodonic" should read --clupanodonic-- lines 54 and 72, "PPD's" should read --PPDs-- line 56, "formmula" should read --formula--

Col. 3, line 1, "PPD's" should read --PPDs-- line 3 should read --N,N'-di(sec.-butyl)-p-phenylenediamine

Col. 4, line 39 should read --the original polymer before aging and during aging for four--

Col. 6, line 35, "CR" should read --CR,-- line 55, "polymesr" should read --polymers-- line 63, "diolegns" should read --diolefins--

Signed and sealed this 19th day of September 1972.

(SEAL)
Attest:

EDWARD M. FLETCHER, JR.       ROBERT GOTTSCHALK
Attesting Officer                  Commissioner of Patents